No. 685,146. Patented Oct. 22, 1901.
C. JOHNSON.
GANG TRIMMER.
(Application filed Mar. 26, 1901.)
(No Model.) 6 Sheets—Sheet 1.

WITNESSES
INVENTOR
CHARLES JOHNSON
BY
HIS ATTORNEYS

No. 685,146. Patented Oct. 22, 1901.
C. JOHNSON.
GANG TRIMMER.
(Application filed Mar. 26, 1901.)
(No Model.) 6 Sheets—Sheet 2.

WITNESSES
E. G. Stander
Richard Paul

INVENTOR
CHARLES JOHNSON
BY Paul & Hawley
HIS ATTORNEYS

No. 685,146. Patented Oct. 22, 1901.
C. JOHNSON.
GANG TRIMMER.
(Application filed Mar. 26, 1901.)
(No Model.) 6 Sheets—Sheet 5.

WITNESSES
E. G. Stause
Richard Paul

INVENTOR
CHARLES JOHNSON
BY Paul & Hemby
HIS ATTORNEYS

No. 685,146. Patented Oct. 22, 1901.
C. JOHNSON.
GANG TRIMMER.
(Application filed Mar. 26, 1901.)
(No Model.) 6 Sheets—Sheet 6.
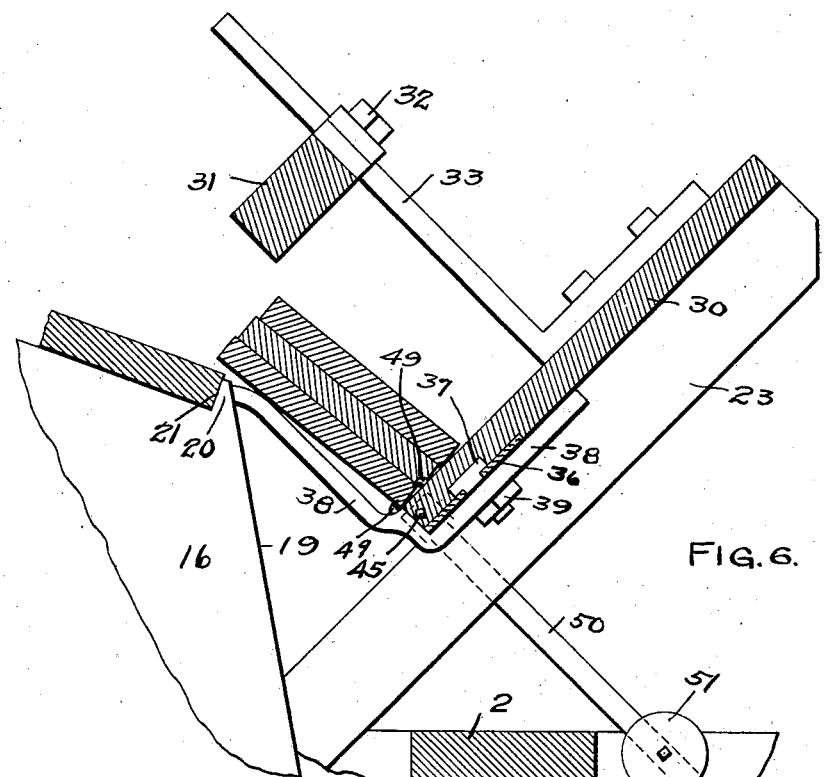
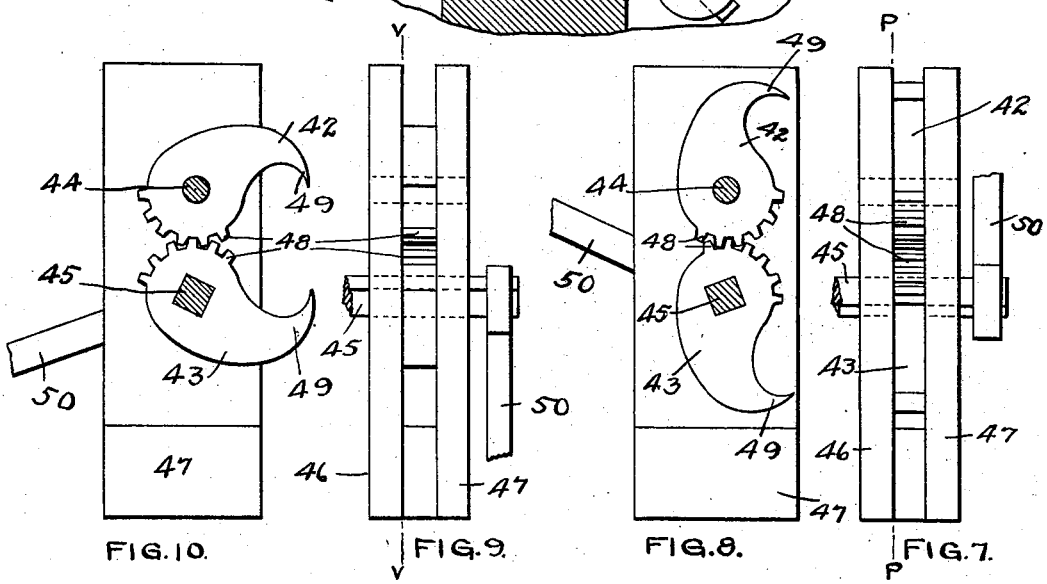
FIG.10. FIG.9. FIG.8. FIG.7.
WITNESSES
INVENTOR
CHARLES JOHNSON
BY
HIS ATTORNEYS
THE NORRIS PETERS CO., PHOTO-LITHO., WASHINGTON, D. C.

UNITED STATES PATENT OFFICE.

CHARLES JOHNSON, OF MINNEAPOLIS, MINNESOTA, ASSIGNOR OF ONE-HALF TO A. R. ROGERS, OF MINNEAPOLIS, MINNESOTA.

GANG-TRIMMER.

SPECIFICATION forming part of Letters Patent No. 685,146, dated October 22, 1901.

Application filed March 26, 1901. Serial No. 52,878. (No model.)

*To all whom it may concern:*

Be it known that I, CHARLES JOHNSON, of Minneapolis, county of Hennepin, State of Minnesota, have invented certain new and useful Improvements in Gang-Trimmers, of which the following is a specification.

My invention relates to machines for trimming the ends of lumber.

The object of the invention is to provide means for positively and accurately feeding the lumber to the saws, whereby the ends to be trimmed will reach the saws simultaneously and even cutting of the same will be insured.

A further object is to provide a mechanism especially adapted for feeding box-lumber, a number of boards being placed in the machine at once and rapidly and automatically moved one at a time past the saws.

Other objects of the invention will appear from the following detailed description.

The invention consists generally in providing improved feeding means for positively and simultaneously moving the ends of the lumber past the saws.

Further, the invention consists in an improved hopper device from which the boards are automatically removed one at a time by the feed mechanism.

Further, the invention consists in means in connection with the hopper for holding the boards in place prior to their engagement with the feed mechanism.

Further, the invention consists in means for yieldingly holding the boards during the trimming operation.

Further, the invention consists in various constructions and combinations, all as hereinafter described, and particularly pointed out in the claims.

Figure 1:
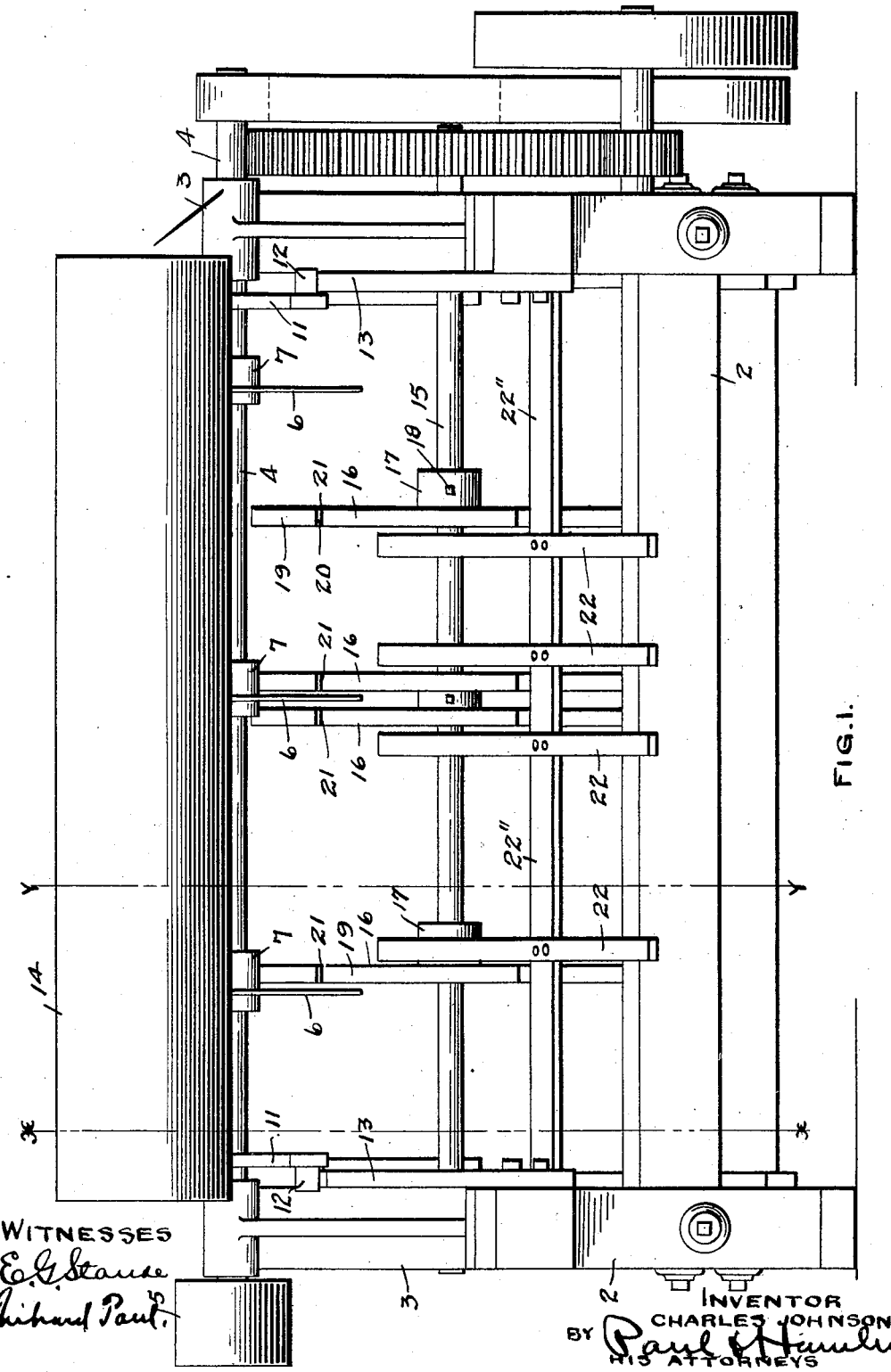
Figure 2:
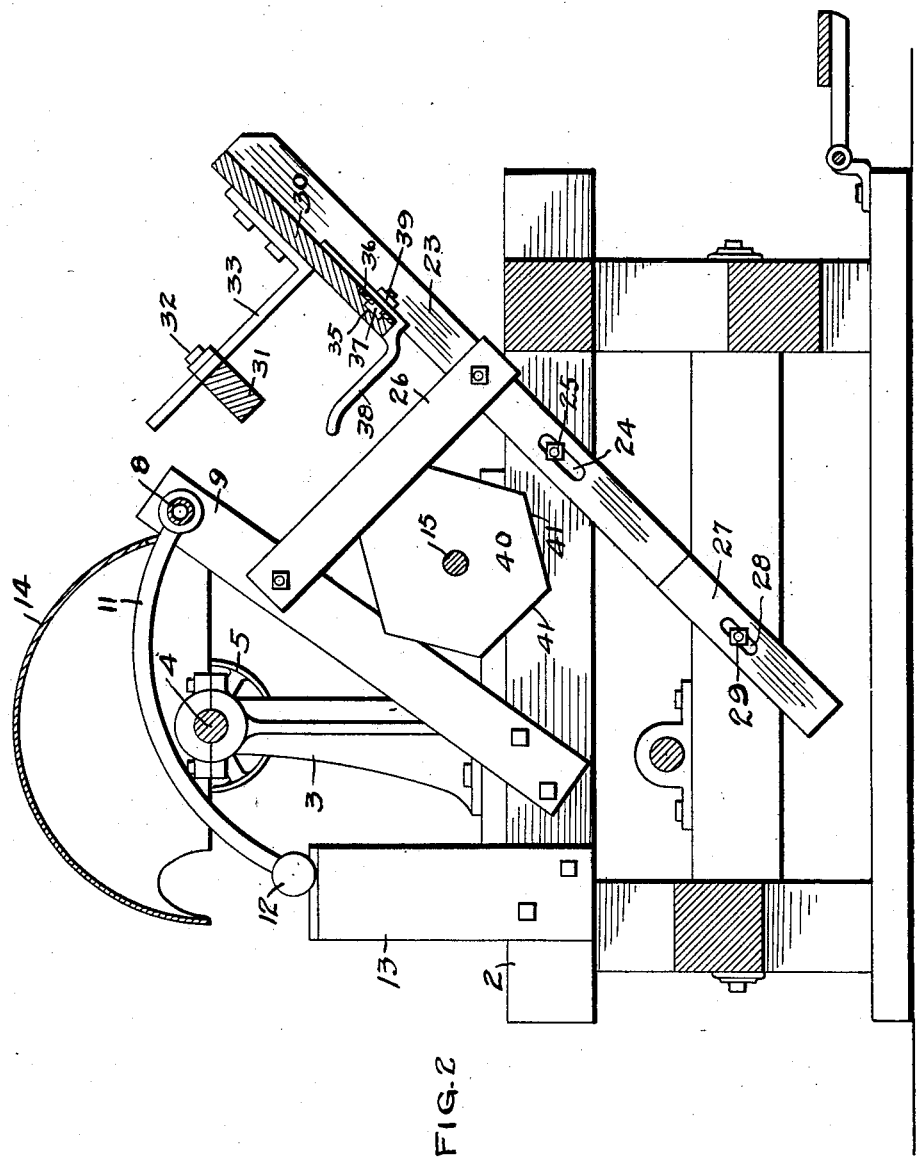
Figure 3:
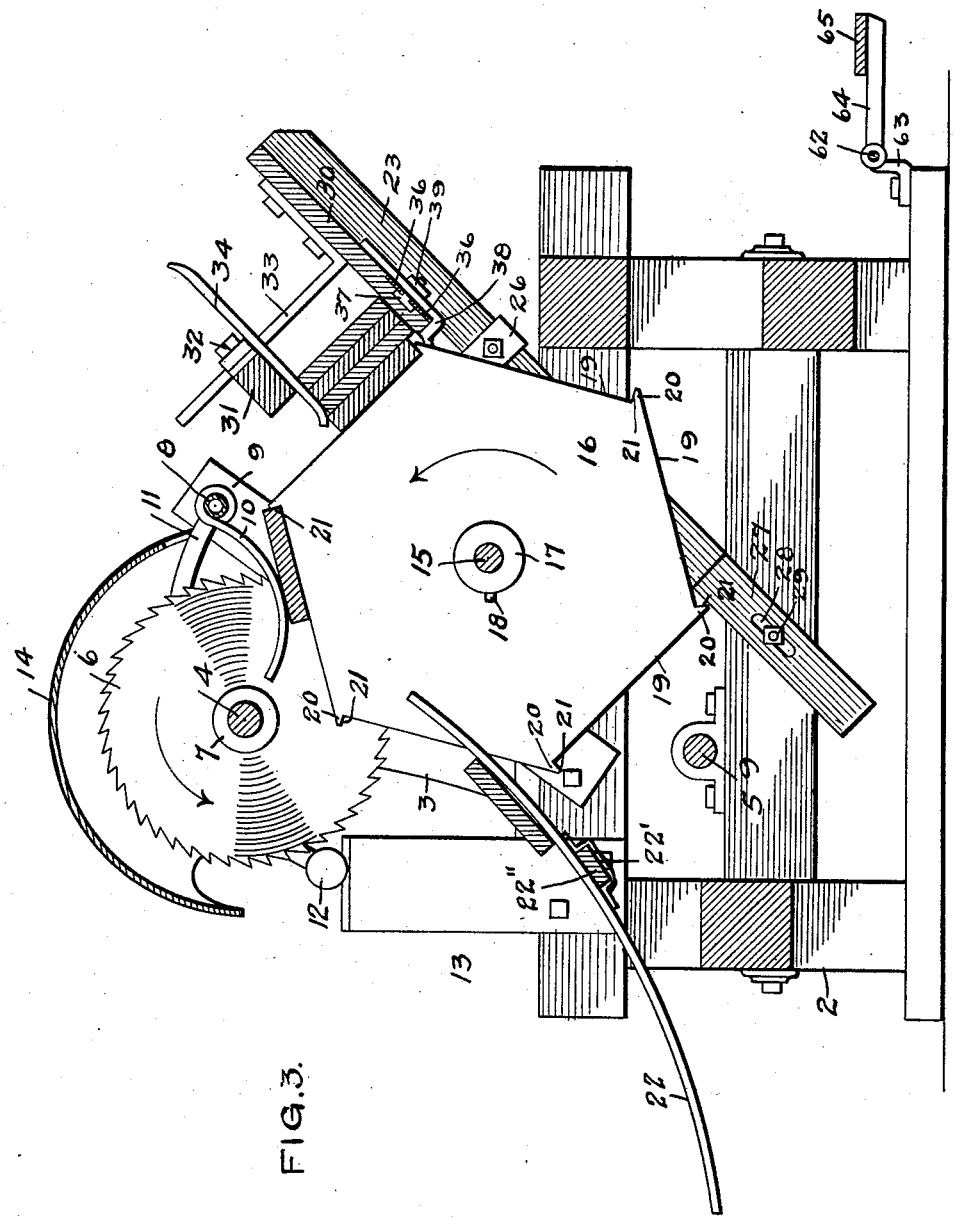
Figure 4:
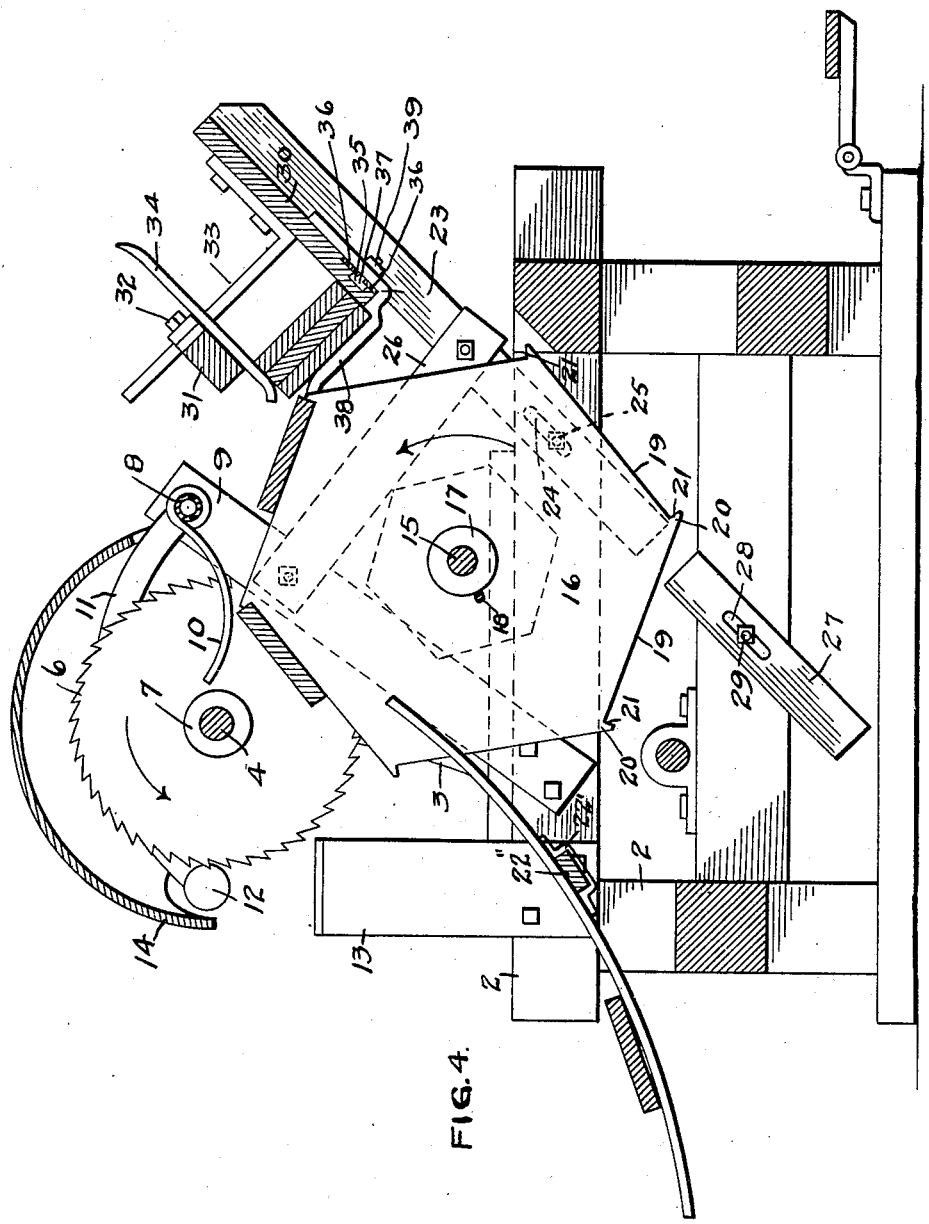
Figure 5:
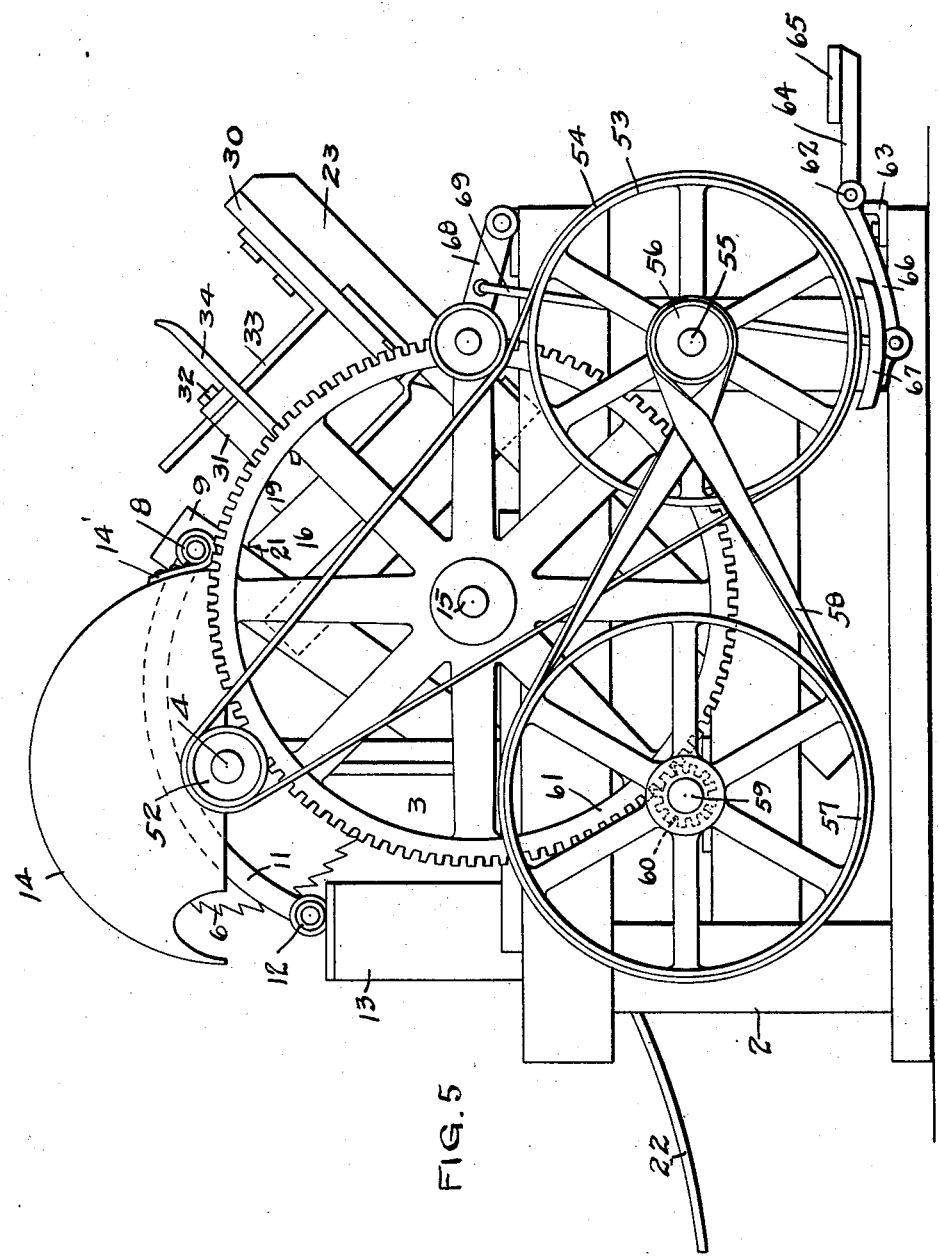

In the accompanying drawings, forming part of this specification, Figure 1 is a rear elevation of a machine embodying my invention. Fig. 2 is a sectional view on the line $x\,x$ of Fig. 1 looking toward the left hand. Fig. 3 is a vertical section on the line $y\,y$ of Fig. 1, showing the feed mechanism engaging the bottom board in the hopper. Fig. 4 is a view on the same sectional line, showing the position of the parts just as the board is passing out of the hopper. Fig. 5 is an end elevation showing the driving mechanism. Fig. 6 is a detail view showing a modified means for holding the upper boards while the bottom board of the series is being removed. Fig. 7 is an edge view of the clamping device for gripping the edges of the upper boards. Fig. 8 is a section on the line $p\,p$ of Fig. 7. Fig. 9 is an edge view of the clamp, showing the jaws in a closed position. Fig. 10 is a section on the line $v\,v$ of Fig. 9.

In the drawings, 2 represents a frame whereon the mechanism of the machine is supported.

3 3 are standards mounted at each end of the frame, having bearings for a saw shaft or arbor 4, provided with a pulley 5, driven from a suitable source of power.

6 represents a series of saws on the arbor or shaft 4, driven at a high speed, their hubs 7 being adjustable to permit the distance between the saws to be regulated at will.

8 is a rock-shaft, preferably of gas-pipe, mounted in arms 9, that are secured to the frame and extend up beneath the saws. A series of spring-fingers 10 are secured on the shaft 8 and adapted to yieldingly bear upon the boards and prevent them from slipping out of place and clogging the saws. Any suitable means may be provided for holding these fingers down upon the boards, but I prefer to provide curved arms 11 at each end of the shaft and extending backward to the rear of the saws and provided with lateral extensions 12, that engage stops 13 on the frame 2. The weight of these arms serves to hold the fingers 10 upon the boards with a yielding pressure, allowing them to rise and fall as the boards pass beneath them. A hood 14 is pivotally supported on the shaft 8 by straps 14' and extends over the tops of the saws, forming a shield therefor, which may at any time be swung back when access to the saws is desired for adjusting, sharpening, or other purposes.

15 is a shaft mounted in suitable bearings on the frame 2 and carrying a series of feed disks or plates 16. These disks have hubs 17, that are adjustable on the shaft and may be secured in any desired position thereon by means of set-screws 18. There may be as many of these disks as are found necessary or desirable; but where three saws are employed, as I have shown in the drawings, I prefer to employ four disks, arranging them substantially as shown in Fig. 1, the two middle ones being arranged on opposite sides of the center saw and having a common hub. These disks will stand in the same relative position with respect to the center saw; but the position of the outer disks will be changed according to the length of the boards to be trimmed and the position of the end saws. The disks are polygonal in form, having a series of flat peripheral faces 19, and I have shown disks having six faces; but there may be a greater or less number, as preferred, according to the size of the disks and the width of the boards to be trimmed. At the intersection of the faces I provide a series of lugs 20, having flat bearing-surfaces 21, that are adapted to engage the edge of a board and move the same past the saws as the disks are revolved. The disks are adjusted on their shaft so that the lugs of each disk will be exactly opposite the corresponding lugs of the other disks that engage the board, and their flat bearing-surfaces will be directly in line with each other and will remain so at all times during the operation of the machine, and as the disks travel at the same speed it follows that each board will be advanced uniformly—that is, one end will travel at the same speed and the same distance as the other end, and consequently the ends of the boards will reach the saws simultaneously and be evenly and squarely trimmed. As the boards pass up toward the saws they will be engaged by the fingers 10 and held down upon the faces 19 with a yielding pressure during the trimming operation. After the boards pass the saws they are deposited by the disks upon the curved ways 22, that are adjustably secured by straps 22' on a cross-bar 22'', and slide out at the rear end of the machine.

In order that the boards may be fed rapidly to the machine, I prefer to provide a hopper apparatus comprising bars 23, having slots 24 to receive bolts 25, secured in the frame 2. These bars are pivotally connected with the arms 9 by links 26, which permit vertical movement of said bars, and stops 27, provided on the frame 2 and adjustable by means of slots 28 and bolts 29, limit the downward movement of said bars and the boards supported thereon. The bars 23 are connected by a board 30, which forms the outer wall of the hopper.

31 represents a narrow board or bar forming the inner wall of the hopper and adjustable by means of set-screws 32 on cross-arms 33, secured at intervals on the board 30. This board or bar 31 may be moved back and forth on the arm 33 to increase or decrease the width of the hopper, according to the width of the boards to be trimmed.

34 represents a series of spring guiding-fingers secured to the board 31 and extending above and below the same and adapted to form guides for the boards when placed in the hopper and to engage the inner edges of the same and hold them in position as the hopper is raised and lowered. The board 30 is provided with a longitudinal groove 35, overhanging which are plates 36, arranged with a space between them, wherein the shank of a bolt 37 is adapted to slide, its head moving in said groove. I prefer to provide a series of these bolts at intervals and arrange them upon a series of brackets 38, that form the open bottom of the hopper. The brackets are locked by the nuts 39, which upon being loosened permit the bolts to be moved back and forth in their grooves to adjust the brackets according to the position of the disks 16. The hopper will be so adjusted that when it is in its down position the disks will pass up between the supporting-brackets and the lugs thereon will engage the outer edge of the lower board of the series and push the same out of the hopper toward the saws. In Fig. 3 I have shown the disks on the point of removing a board from the hopper, and as the movement of the board is on the arc of a circle whose center is the axis of the disk the boards that remain in the hopper would, if the hopper was stationary, be tilted up by the movement of the lower board and would require the constant attention of the operator to see that each board was lying properly in the hopper to be engaged by the revolving disks. To obviate this objection and render unnecessary any watchfulness on the part of the attendant, I prefer to provide means for raising the hopper and its contents each time a lower board of the series is removed. With this end in view I provide disks 40, one at each end of the shaft 15, each disk having a series of faces 41, corresponding in number and respectively opposite the faces on the disk 16. Each time the shaft 15 revolves one of the faces 41 at each end of the hopper will engage the links 26, and as the feed-disks engage the lower board and begin to push it out of the hopper the entire hopper will be swung up on its pivots, so that the lower board in passing out will clear the next to the lower board and prevent any disturbance of it or the remaining boards. The upward movement of the hopper will depend upon the diameter of the disks 40, and the depression of the same may be regulated by means of the stops 27. Each time a board is removed the hopper will be raised, and as the bottom board passes out from beneath the others the hopper will drop back to its normal position, so that the next board of the series will be in the path of the approaching lugs on the feed-disks. The guide or guard fingers 34, engaging the inner edges of the upper boards, will prevent them from being pushed out of the hopper by the removal of the bottom board.

In Fig. 6 I have shown a modification of the device for holding the upper boards in place in the hopper while the lower board is being removed, which consists in dispensing with the guard-fingers and providing jaws 42 and 43, mounted on shafts 44 and 45 between plates 46 and 47. Each jaw is provided with teeth 48, meshing with each other, so that when one jaw is operated the other will be moved also. The jaws are provided with hook-shaped ends 49, that are adapted to grip the edge of the board that is next to the bottom and hold the same securely during the operation of removing the bottom board from the hopper. The board that is next to the bottom being firmly held will of course prevent those above it from being disturbed while the bottom board is being removed, and hence the boards may be taken out of the hopper one at a time without in any way disarranging those remaining. The shaft 45 is projected through the plate 47 and is provided with a crank 50, whereon a weight 51 is adjustably arranged. This crank or lever-arm is normally held in its depressed position by said weight to grip the edge of the next to the lower board of those placed in the hopper, so that when the hopper is elevated the jaws of the clamp will be closed and the board engaged thereby firmly held. The position, however, of the lever-arm or crank is such that when the hopper has nearly reached the limit of its down movement the lever will engage with a portion of the frame 2 and further movement of the lever will be prevented, while the hopper will keep on to the limit of its stroke, at which point the jaws will be opened and the board freed from the clamp. As soon as the lower board is engaged by the lugs on the feed-disks the hopper will begin to rise and the lever-arm will be lifted away from the frame, allowing the weight to again actuate the jaws of the clamp to grip the edge of the next to the bottom board. It will be immaterial whether the jaws clamp the edge of the board next to the one being removed alone or both that one and the one above it so long as they are held in the hopper while the board at the bottom is being pushed out. The shaft 45 preferably extends across the front wall of the hopper, being suitably mounted on the board 30, as indicated in Fig. 6, and the clamping-jaws are provided at intervals along the shaft in convenient positions to grip the boards near their ends. I have found that one lever-arm and weight is sufficient to actuate all the jaws; but, if preferred, several of them may be employed.

As heretofore stated, the saws are driven at a high rate of speed, while the feed-disks have a comparatively slow movement.

I prefer to drive the feed mechanism from the saw shaft or arbor, and to provide for the necessary reduction in speed I arrange a small pulley 52 on the saw-shaft, connecting the same with a larger pulley 53 by a belt 54. The pulley 53 is mounted on a shaft 55, provided with a pulley 56, that is connected with a pulley 57 by a belt 58. The pulley 57 is mounted on a shaft 59, supported in bearings on the frame of the machine and having a pinion 60, meshing with a large gear 61, that is mounted on the shaft 15. I prefer to have the saws and the feed-disks revolved in the same direction, as I have found that the ends of the boards will be more smoothly trimmed than where the feed and saws operate in different directions.

At the front of the machine I prefer to provide a shaft 62, supported in bearings in brackets 63, and having arms 64, connected by a footpiece 65. This footpiece extends along the front of the machine conveniently to the foot of the operator and may be depressed by a person standing in front of the hopper. An arm 66 is provided on the shaft 62, carrying a brake-shoe 67, adapted to engage the pulley 53. A belt-tightener 68 is pivoted on the frame of the machine in position to engage the belt 54, and a rod 69 pivotally connects the belt-tightener with the arm 66. The belt-tightener is normally in engagement with the belt, and the operation of the saw-shaft will revolve the pulley 53 also. If at any time, however, on account of accident or for any other purpose the operator desires to stop the machine, he will depress the footpiece 65, rocking the shaft 62 and moving the brake-shoe into contact with the pulley. This movement of the brake-shoe will raise the belt-tightener away from its belt, which will then be sufficiently loose to allow the pulley 52 to turn without operating the feed-driving mechanism.

The operation of the machine is as follows: The attendant having adjusted the saws and the feed-disks the desired distance apart to trim the ends of the boards to be passed through the machine places in the hopper a pile of boards, usually eight or ten in number, depending upon the size of the hopper. The saws are then set in motion and the feed-disks will begin to revolve, and each time the lugs on the disks pass under the hopper they will engage the bottom board therein and push it forward past the saws, which will rapidly and evenly trim the ends thereof. After leaving the saws the board will be carried forward by the disks and deposited upon the guides, which will take it out of the machine. As the lugs upon each disk are exactly opposite the corresponding lugs on the other disks, it follows that each end of a board will travel at the same speed and will reach the saws at the same time. The disks being rigidly secured on the shaft there will be no lost motion, and the boards will be positively and accurately advanced with every revolution. As fast as a board is withdrawn from the hopper the one above will drop down in its place automatically, and the feed mechanism will need no attention on the part of the operator except to see that the hopper is supplied with boards. Each time that a board is withdrawn from the hopper the other boards therein will be raised up by the vertical movement of the hopper out of the path of the one that is being removed. Boards of various lengths may be trimmed by the simple adjustment of the saws and the feed-disks.

Having thus described my invention, I claim as new and desire to secure by Letters Patent—

1. In a gang-trimmer, the combination, with the saws, of an oscillating hopper wherein a series of boards are placed, feed-disks having a series of flat peripheral faces, lugs provided on said faces and adapted to engage the bottom board of the series and move the same out of the hopper past said saws and means for raising said hopper simultaneously with the removal of a board therefrom, for the purpose specified.

2. In a gang-trimmer, the combination, with the saws, of a hopper wherein a series of boards are placed, one upon the other, rotating means provided with means for engaging the bottom board of the series, separating the same from the others and moving it past the saws, and means for raising the upper boards out of the path of the bottom board while the latter is being removed, substantially as described.

3. In a gang-trimmer, the combination, with the saws, of an oscillating hopper wherein a series of boards are placed one above the other, feed-disks provided near said saws, a series of peripheral lugs provided on said disks, each lug being adapted to engage the edge of the bottom board of the series as it passes beneath said hopper and move the board out of the hopper past the saws and means for raising said hopper when the bottom board of the series is being removed, for the purpose specified.

4. In a gang-trimmer, the combination, with the saws, of a vertically-movable hopper wherein a series of boards are placed one above the other, and feed-disks having a series of flat peripheral faces adapted to engage the bottom board of the series and move the same out of said hopper past the saws and means for intermittently raising said hopper.

5. In a gang-trimmer, the combination, with the saws, of a hopper wherein a series of boards are placed one above the other, feed-disks provided near said hopper and saws, a series of lugs provided on said disks, the opposite corresponding lugs being adapted to engage the edge of the bottom board of the series as said disks pass beneath the hopper and move the board out of the hopper past said saws, and means for moving the upper boards out of the path of the bottom board during the removal of the latter.

6. In a gang-trimmer, the combination, with the saws, of a vertically-movable hopper wherein a series of boards are placed, feed-disks having a series of flat faces and provided near said hopper and adapted to move boards one at a time out of the hopper past said saws, and means for raising said hopper and the boards therein while the bottom board is being withdrawn, for the purpose specified.

7. In a gang-trimmer, the combination, with the saws, of an oscillating hopper wherein a series of boards are placed, feed-disks having a series of flat faces and provided near said hopper and saws, a series of lugs provided on said disks, the opposite corresponding lugs on said disks being adapted to engage the lower board of the series and move the same out of said hopper past said saws, and means for intermittently raising said hopper and its contents while the bottom board is being removed, substantially as described.

8. In a gang-trimmer, the combination, with the saws, of two or more feed-disks having a series of flat peripheral faces, a hopper wherein a series of boards are placed and wherefrom they are removed one at a time by the revolution of said disks, and disks having faces corresponding to those upon said feed-disks for raising said hopper intermittently to remove the upper boards out of the path of the bottom board while it is being withdrawn, for the purpose specified.

9. In a gang-trimmer, the combination, with the saws, of a hopper wherein boards are placed, a series of revolving feed devices having flat peripheral faces adapted to engage the boards one at a time beginning at the bottom and move the same out of the hopper past said saws, means for elevating the hopper while the bottom board is being removed, and means for retaining the upper boards in place, substantially as described.

10. In a gang-trimmer, the combination, with the saws and the polygonal feed devices, of an oscillating hopper, means for intermittently raising said hopper while the bottom board therein is being removed, and a clamp device adapted to grip the lower remaining boards, for the purpose specified.

11. The combination, with the polygonal feed devices, of an oscillating hopper wherein a series of boards are placed one above the other, means for intermittently raising said hopper, and means for gripping the lower remaining board while the bottom board is being withdrawn from the hopper.

12. In a gang-trimmer, a hopper comprising an outer side wall 30, an opposite wall adjustable with respect to said outer wall, and a series of arms provided on said wall 30 and adjustable lengthwise thereof and projecting across the bottom of the hopper forming supports therein, for the purpose specified.

13. In a gang-trimmer, a hopper comprising a board 30, arms 33 secured thereon, a bar 31 adjustably supported upon said arms and forming a wall of the hopper, suitable depending retaining-fingers provided on said bar and arms provided on said board 30 and extending across the bottom of the hopper, substantially as described.

14. In a gang-trimmer, the combination, with a hopper wherein a series of boards are placed one above the other, of means for intermittently raising said hopper, a series of clamping-jaws adapted to grip the edges of the boards, said jaws having coacting teeth whereby the movement of one jaw will operate the other also, a weighted lever connected with one of said jaws and adapted to close the jaws when the hopper is raised and to be operated to separate the jaws when the hopper is near the limit of its down movement.

15. The combination, with the hopper wherein a series of boards are placed one above the other, of a series of jaws 42 and 43 arranged in pairs at intervals in the wall of said hopper, a shaft 45 whereon one of the jaws of each pair is arranged, said jaws having coacting teeth whereby movement of one will actuate the other, a lever-arm provided on the shaft 45, a weight 51 on said lever-arm whereby said jaws will be closed when the hopper is raised, and means for raising said hopper for the purpose specified.

16. The combination, with the saws, of a series of revolving feed-disks having flat peripheral faces, the shaft whereon said disks are mounted, an oscillating hopper, and disks 40 mounted upon said shaft and having a series of faces corresponding in number to the faces on said feed-disks and adapted to engage and elevate said hopper during the operation of said feed-disks.

17. The combination, of the polygonal feed-disks and the saws, with a swinging hopper, means for intermittently raising the said hopper, and adjustable stops whereby the downward movement of said hopper is controlled, for the purpose set forth.

18. The combination with a hopper, of feed-disks revolving beneath the same, said disks being provided with a series of lugs to engage the edge of the bottom board and move it out of the hopper, and also having flat faces whereon the boards are carried, means for moving the upper boards out of the path of the bottom board while the latter is being removed, means for holding the boards on said disks, and trimming-saws provided near said disks, substantially as described.

19. The combination, with a movable hopper adapted to contain a series of boards placed one above the other, of polygonal feed-disks provided beneath said hopper and having a series of lugs adapted to engage the bottom board of the series, means for intermittently raising said hopper and its contents while the bottom board is being removed, means for retaining the upper boards in place during the removal of the lower board, means for holding the boards on the faces of said disks, and trimming-saws provided near said disks, substantially as described.

20. In a gang-trimmer, the combination, with the saws, of polygonal feed devices, an oscillating hopper, and means for intermittently raising said hopper.

21. In a gang-trimmer, the combination, with the saws, of polygonal feed devices, an oscillating hopper, means for intermittently moving said hopper, and means for limiting the stroke or movement of said hopper, substantially as described.

22. In a gang-trimmer, the combination, with the saws, of a movable hopper wherein boards are placed one upon another, means for engaging the bottom board of the series, separating it from the other boards and moving it past the saws, and means for moving said hopper and its contents away from said board-engaging means while the bottom board is being separated from the others, substantially as described.

In witness whereof I have hereunto set my hand this 21st day of March, 1901.

CHARLES JOHNSON.

In presence of—
RICHARD PAUL,
M. C. NOONAN.